3,409,568
ETHYLENE/VINYL CHLORIDE COPOLYMER PIGMENT BINDER FOR COATED PAPER PRODUCTS AND PROCESS OF PREPARATION
Harry P. Holladay and Paul R. Graham, St. Louis, Mo., assignors to Monsanto Company, St. Louis, Mo., a corporation of Delaware
No Drawing. Filed Nov. 27, 1964, Ser. No. 414,453
16 Claims. (Cl. 260—8)

ABSTRACT OF THE DISCLOSURE

A pigment binder for paper coatings, said pigment binder containing at least a portion of an ethylene/vinyl chloride copolymer having from about 20 to about 95% by weight polymerized vinyl chloride. A coated paper product, a paper coating composition, and a process of coating paper using the ethylene/vinyl chloride copolymer pigment binder are claimed.

---

This invention relates to mineral or pigmented coating compositions for paper, the paper coated therewith and its process of preparation. In a major aspect, this invention relates to the use of an ethylene/vinyl chloride copolymer in latex form as a pigment binder in coating compositions particularly adapted for use with paper products. In another aspect, this invention relates to coated paper having good brightness and gloss and excellent affinity for printing inks. In yet another aspect, the present invention relates to a method for forming a continuous, adherent coating on paper substrates.

In general, mineral coatings are applied to paper to improve the appearance, the printing qualities, or other properties of the paper. The mineral or pigment coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of binding the mineral material to the paper so that the mineral will not be removed by the pull of printing ink during the inking operation. Nevertheless, the particular adhesive used does have considerable influence upon the working qualities of the coating composition, e.g. viscosity, flow, spreadability and ink absorption. Further, the adhesive used in the coating composition has a definite effect upon the quality and appearance of the finished coated paper made therewith. As an example, the plasticity of the adhesive has a pronounced effect on the ability of the supercalendar to produce a level and good printing surface.

Aqueous solutions of starch or casein have been and are currently used as pigment binders for paper products. The use of either starch or casein as a pigment binder for coating paper leaves much to be desired. The use of starch provides a paper having poor water resistance. Further, starch loses much of its binding ability upon calendering of the paper. The use of casein as a pigment binder presents the objectionable feature that the casein itself varies in composition, with a resultant variation in the composition of the coated paper on which it is used. A casen binder also loses a significant portion of its binding ability upon calendering of the paper. Currently, one of the more popular synthetic resins useful as a pigment binder is a styrene-butadiene latex. Its chief strong point is its low cost in combination with satisfactory pick resistance, wet rub resistance, gloss ink holdout, brightness, and gloss of the paper coated therewith. Objectionable features include yellowing upon aging and odor. Also employed in some instances are pigmented aqueous dispersions of such synthetic resinous polymers as the polyalkyl acrylates and methacrylates. The primary advantages of the acrylic binders include properties comparable to the styrene-butadiene compositions plus freedom from objectionable odor and resistance to yellowing. Such polymers, however, are expensive for use in paper coating, being approximately 50 to 75% more expensive than the styrene-butadiene binder. Polyvinyl acetates are another class of pigment binders having properties roughly equivalent to styrene-butadiene. The chief advantages of acetate binders are freedom from objectionable odor and good brightness and aging characteristics. One disadvantage is its cost which is intermediate between the styrene-butadiene binders and the acrylic binders.

Use of the pigment binders subsequently described herein provides acceptable performance comparable or superior to the styrene-butadiene, acrylic and acetate binders. Further, the novel pigment binders of this invention provide the freedom from odor and resistance to yellowing characteristic of the acrylic binders at prices equal to or less than the styrene/butadiene binders. In addition, gloss of calendered mineral-coated paper is improved substantially by use of the novel pigment binders of this invention.

It is a principal object of this invention to provide an ethylene-vinyl chloride pigment binder for use in pigmented or mineral-coated paper. It is another object to provide a low cost, high quality mineral coating composition for paper products. It is a further object to provide an improved mineral-coated paper product. It is a still further object to provide a method for coating paper products. Additional objects, benefits, and advantages will become apparent as the detailed description of the invention proceeds.

Subsequently described in detail are coating compositions which are aqueous dispersions of mineral and binder. Separately described are paper coatings which are the dried, finished coatings of mineral adhered to the paper base.

The improved coating compositions of the present invention are in the form of aqueous dispersions comprising water, a finely divided paper coating mineral and at least 4% by weight based upon said mineral of a polymeric binder, at least a portion of said binder being an ethylene/vinyl chloride copolymer having from about 20 to about 95%, preferably from about 30% to about 80%, by weight polymerized vinyl chloride. The coating compositions of this invention preferably contain from about 30 to about 75% dispersed solids although compositions outside this range can be used if convenience or ease of coating can be sacrificed.

The paper-coating clay or the pigment is an important component of the coating compositions. The principal functions of the pigment are to fill in the irregularities of the paper surface, to produce an even and uniformly absorbent surface for printing and to improve the appearance of the coated sheet. A suitable pigment should have all or most of the following properties—good dispersibility in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment coatings include clays such as kaolinite, illite, montmorillonite, and beidellite; and other materials such as titanium dioxide, kieselguhr, precipitated calcium carbonate, water-ground calcium carbonate, calcium sulfate, calcium sulfite, barium sulfate, blanc fixe, satin white, and zinc pigments, e.g., zinc oxide, zinc sulfide, and lithopane.

The quantity of pigment or mineral in the paper coating compositions of this invention can vary from about 25 to about 75% by weight of the total aqueous dispersion. Narrower preferred ranges will vary depending upon variations within the binder, upon the particular clay or pigment utilized, and upon the desired uses of the finished paper product. A preferred range for Georgia kaolinite is about 30 to about 50% by weight of the total dispersion.

In order to prepare a satisfactory coating mixture, it is necessary to break up aggregates of dry clay into smaller dispersed particles. This is conventionally achieved by adding water and a dispersing agent to the clay solids and agitating the mixture. The clay-water slurries can range from about 30% up to about 80% solids. Even higher solids contents of the suspensions can be achieved with the more effective dispersing agents. Suitable dispersing agents include sodium silicate, sodium tetraphosphate, tetrasodium pyrophosphate, sodium hexametaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5% tetrasodium pyrophosphate based on the weight of clay gives an effective dispersion of Georgia kaolinite clay in a 50/50 clay-water slurry. Other concentrations of dispersing agents for other clay slurries can be readily determined. Aqueous clay dispersions can be prepared using heavy-duty mixers such as sigma-blade and dough-type mixers.

The novel pigment binder of the present invention is an ethylene/vinyl chloride copolymer. An ethylene/vinyl chloride copolymer used alone is a satisfactory pigment binder based on performance characteristics of the coated paper. Cost requirements for most applications, however, dictate the inclusion of a less expensive binder along with the ethylene/vinyl chloride formulation. Such a dilution, a common practice in the use of synthetic resinous pigment binders, provides a significant reduction in cost with only a slight reduction in properties of the coated paper. Examples of commonly used binders include starches, ethylene oxide-modified starches, casein, alpha-protein and other proteinaceous binders. A binder containing about 50% starch, casein or other similar binder and 50% ethylene/vinyl chloride solids has been found to provide a satisfactory cost-performance balance for several uses of coated paper. Other ratios of starch or casein solids to ethylene/vinyl chloride solids include 95:5, 67:33, 60:40, 40:60, 20:80, 5:95, and 0:100. The choice of which ratio binder to use will depend upon its properties desired in the final product, the cost of the binder, and upon the particular ethylene/vinyl chloride latex employed. The ethylene/vinyl chloride binder can of course be used in combination with other synthetic pigment binders in latex form, examples being styrene/butadiene copolymers, the acrylic and methacrylic polymers, and various polyvinyl acetate materials.

Superior appearance and printing characteristics of coated paper are obtained using a coating composition having from about 1 to about 100%, preferably from about 18 to about 33%, by weight binder solids based upon the mineral present in the composition. Preferably, the ethylene/vinyl chloride copolymer is present in the composition at concentrations of from about 6 to about 33% of the mineral.

Suitable for use as a pigment binder are ethylene/vinyl chloride copolymers having from about 20 to 95% by weight polymerized vinyl chloride. Of significant value are those copolymers having from about 50 to about 82% polymerized vinyl chloride. Particularly preferred as a pigment binder, especially when good wet rub characteristics and pick resistance are desirable features in the coated paper, are ethylene/vinyl chloride binders wherein the copolymer solids contain from about 75 to about 80% by weight polymerized vinyl chloride.

Starch or casein can be added to a mineral slurry either in solution or in solid form which will be subsequently dissolved in the water of the slurry. Ethylene/vinyl chloride copolymeric binder is most advantageously added to a mineral slurry in the form of a stable latex. Mechanical stability is an important feature of the latex since the ability of the latex to dry as a coherent film instead of as a crumbly mass depends on this property.

Stability is conveniently measured by the Maron stability test. This test is adequately described in Maron and Ulevitch, Mechanical Stability Test for Rubber Latices, Anal. Chem. 25, 1087 (1953). In general the test measures the ability of a latex to resist coagulation when subjected to a shearing force. For purposes of this discussion, samples tested for thirty minutes according to the test procedure described on page 1088 of the Maron et al. article are considered stable if the amount of coagulum formed does not exceed one gram. This degree of stability permits the preparation of satisfactory pigment binders. Preferred are those latices with a stability of 0.2 gram or less after a 30 minute test period.

Ethylene/vinyl chloride latices having mechanical stabilities of greater than one gram of coagulum per thirty minute test period are generally less suitable for the purposes of this invention because of their reluctance to form the necessary continuous adherent film.

The stable ethylene/vinyl chloride latices are further characterized by a particle size of the emulsified copolymer from about 500 to about 5000 angstroms, preferably from about 1500 to 2500 angstroms. Latices containing solids within these particle size ranges are capable of acquiring the high stability and satisfactory film-forming properties desirable for a pigment binder. Particle sizes of ethylene/vinyl chloride solids can fall outside these ranges if latex syntheses can be developed to produce the required Maron stability of one gram or less.

Acceptable synthesis techniques are described in U.S. patent application Ser. No. 395,899, filed Sept. 11, 1964 and now abandoned. Generally the process comprises mixing the ethylene and vinyl chloride monomers in the presence of an alkaline buffered redox initiator-catalyst system, water, and from about 1% to about 8% by weight based upon the monomer feed, or from about 4% to about 7% based upon the polymer product, of a nonionic emulsifying agent having HLB value of from about 10 to about 17, and reacting the mixture at a temperature and pressure and for a time sufficient to cause polymerization of the monomers. Other suitable emulsifying agents include the anionic emulsifiers having an HLB value of at least 10.

Any system capable of generating free radicals in an aqueous medium can be used in the production of ethylene/vinyl chloride latices. Preferred is a redox system, more explicitly a reduction-oxidation system, which provides the initiation and catalysis for the ethylene/vinyl chloride copolymerization. A suitable redox system used herein consists of an oxidizing agent, a reducing agent, a multivalent metal compound (complexed if necessary so as to remain in solution), and an alkaline buffer. Suitable oxidizing agents include hydrogen peroxide, the inorganic persulfates such as potassium peroxydisulfate, sodium peroxydisulfate, and ammonium peroxydisulfate, the organic hydroperoxides such as cumene hydroperoxide and tert-butylhydroperoxide, and the alkali metal and ammonium perborates. The amount of oxidizing agent which can be used ranges from about 0.01% to about 10% by weight, and preferably from about 0.1% to about 5%, of the monomer feed.

The reducing agents of this system must be capable of reducing a multivalent metal ion from a higher to a lower oxidation state. Examples of reducing agents include sodium, potassium, and ammonium sulfites, thiosulfates, sulfoxylates, bisulfites, and hydrosulfites. A particularly preferred reducing agent for use herein is sodium formaldehyde sulfoxylate. The amount of reducing agent is dependent upon the amount of oxidizing agent employed. Generally, an amount of reducing agent molecularly equivalent to the amount of oxidizing agent is required. This rule is subject to variation depending upon the particular combination of individual reducing and oxidizing agents. For instance, in a potassium or ammonium peroxydisulfate-sodium formaldehyde sulfoxylate system, it has been determined that only 0.7 equivalent of sulfoxylate per equivalent of peroxydisulfate is necessary. In such case, the concentration of sulfoxylate can range from 0.7 to 1.0 equivalent per equivalent of peroxydisulfate.

Inclusion of a multivalent metal compound into the peroxydisulfate-sulfoxylate and other related redox systems leads to faster polymerization rates and higher conversions than are obtained in the absence of the multivalent metal compound. If fast rates and high conversions can be sacrificed, the metal compound can be excluded from several redox systems. The multivalent metal compound as used in the redox system under discussion refers to metallic salts in which the metal ion is capable of existing in at least two different valence states. Examples of such compounds include water-soluble salts of iron, cobalt, nickel, copper, zinc, silver and gold. Frequently the metal is complexed with a sequestering agent to keep the metal ions in solution under the basic conditions employed. This is accomplished by addition of a compound such as an alkali metal ethylenediamine-tetraacetate to the aqueous solution. The metal salts added to the redox system contains the metallic ion in its higher oxidation state to prevent its immediate reaction with the oxidizing agent of the system. In a preferred embodiment, ferric ammonium sulfate is used in conjunction with sodium ethylenediaminetetraacetate to provide ferric versenate for the redox system. The concentration of multivalent metal ranges from about 0.0001% to about 0.1% by weight, and preferably from about 0.001% to about 0.01%, of the monomer feed.

Water is a necessary component of the polymerization system. The amount of water can vary widely however, depending upon the solids content desired in the finished latex. The solids content is dependent upon the quantity of monomer feed introduced into the system and the percent conversion, which is in turn dependent upon several of the above-described variables. In preferred embodiments, formulations containing water from about 50% to about 250% of the monomer feed have been used.

The buffer used herein can be any water-soluble basic compound whose 0.1 molar solution has a pH from about 7 to about 12, preferably from 8 to about 11. Examples of compounds include borax, sodium carbonate, sodium bicarbonate, potassium tartrate, sodium citrate, and ammonium hydroxide. The amount of buffer required for the process utilized herein is that amount necessary to maintain the pH of the reaction mixture between 7 and 12, preferably above pH 9. In a preferred embodiment using equal quantities of ammonium hydroxide and potassium carbonate together with a potassium peroxydisulfate oxidizing agent, a suitable concentration of buffer is from about 0.01% to about 10% by weight, and preferably from about 0.5% to about 1.5%, of the monomer feed. If an oxidizing agent such as ammonium peroxydisulfate is used instead of the potassium salt, it will usually be necessary to increase the preferred concentration range of buffer to about 1% to 3% or more.

The emulsifying agent is an essential component of our disclosed process if the process is to be capable of producing a stable ethylene/vinyl chloride latex having 35% or more dispersed solids. Acceptable for use herein are those non-ionic surfactants having an HLB of from about 10 to about 17, and those anionics having an HLB of at least 10, preferably from about 13 to about 17, and more preferably from about 14 to 15. The term "HLB" is discussed in Griffin, Classification of Surface—Active Agents by HLB, J. Soc. Cosmetic Chemists, 1, No. 5, pp. 311 to 326 (1949). Briefly the HLB value indicates the hydrophilic-lipophilic balance of an emulsifier. Most of the common emulsifiers lie in an HLB range of from 1 to 20 where a value of one indicates a high degree of oil solubility and a value of twenty indicates high water solubility. Examples of suitable nonionic emulsifiers include alkyl aryl polyether alcohols such as lauryl phenyl polyether ethanol, alkanol amine fatty condensates such as triethanolamine, coconut fatty acid ethanolamide, lauric acid propanolamide, fatty alcohol polyglycol ether, myristyl phenyl polyglycol ether, glycerol sorbitan laurate, polyoxyethylene sorbitol hexaoleate, polyoxyethylene sorbitol septaoleate, polyoxyethylene sorbitol oleate laurate, a blend of sorbitan monostearate and polyoxyethylene stearate, fatty ester of polyethylene glycol, glycolamido stearate, propylene glycol monostearate, alkylphenol polyglycol ethers containing from 2 to 40 moles of ethylene oxide per mole of ether, and alkanol polyglycol ethers containing from 2 to 40 moles of ethylene oxide per mole of ether. Suitable anionic emulsifying agents, which have an HLB value of at least 10, are sodium dodecylbenzenesulfonate, sodium decylbenzenesulfonate, ammonium laurylbenzenesulfonate, potassium stearylbenzenesulfonate, sodium stearylbenzenesulfonate, sodium stearylsulfate, potassium myristylnaphthalenesulfonate, potassium oleate, sodium laurate, ammonium dodecylphenoxypolyoxyethylene ethyl sulfate, sodium lauryl sulfate, nonylphenoxy acetic acid, sulfated cresylic acid, disodium-N-octadecylsulfosuccinamate, tetrasodium N - (1,2 - dicarboxyethyl)-N-octadecylsulfosuccinamate, diamyl ester of sodium sulfosuccinic acid, dihexyl ester of sodium sulfosuccinic acid, bis(tridecyl) ester of sodium sulfosuccinic acid, dioctyl sodium sulfosuccinate, sodium dodecyl diphenyl oxide disulfonate, benzene potassium sulfonate, sodium salt of a sulfonated naphthalene-formaldehyde condensate, sodium salt of polyethoxy alkyl phenol sulfonate, sodium oleyl methyl tartrate, and triethanolamine salt of polyethoxy alkyl phenol sulfonate.

The concentration of emulsifier is much more restrictive than suitable concentration ranges for the other components of the polymerization system under discussion. Depending upon the particular emulsifier and upon the electrolyte chosen for use therewith, the concentration can range from about 1% to about 9% by weight of the monomer feed. Preferred ranges vary depending upon the emulsifier, the rate of reaction, the percent conversion and ease of latex separation desired. A preferred concentration range for a polyoxyethylene nonylphenyl having 10 moles of ethylene oxide per mole of nonylphenol is from about 2% to about 5% by weight of the monomer feed. Concentrations of less than 2% can be used but only at considerable sacrifice of stability; emulsifier concentrations of more than 5% can likewise be used if lower reaction rates can be tolerated. Concentration of emulsifier is even more restrictive when expressed as a percentage of the polymer solids formed during the reaction. A suitable range of emulsifier is from about 3% to about 8% by weight, preferably from about 5% to about 7.5% of the polymer product.

Reaction temperatures can vary from −10° to about 75° C., preferably from about 25° to 50° C., and more preferably, when used in conjunction with preferred components and pressures, from about 30 to 35° C. At polymerization temperatures below 25° C., it is advantageous to include a small quantity (about 10% of the water present) of a lower alkyl alcohol such as methanol or ethanol to prevent hydrate formation of the monomer feed.

Reaction pressures are superatmospheric and can vary from less than 500 to more than 35,000 p.s.i. A preferred range is from about 600 to about 10,000 p.s.i., particularly from about 850 to about 5,000 p.s.i. During polymerization with its consequent conversion of gaseous monomers to solid polymer, the pressure is maintained within the desired limits by injection of water or monomers, usually by injection of gaseous vinyl chloride.

In the optimization of the latex preparation stirring rates are of significant importance. Too little stirring gives lower polymerization rates; too much results in partial coagulation of the latex solids. The proper stirring rate is of course dependent upon the size and shape of the reaction vessel in relation to the size, shape and placement of the stirrer blades. Using a one gallon autoclave with inside dimensions of 12" x 5" in diameter together with three 4-bladed turbines, each blade of the turbine being 2" long and 1" wide and each turbine being spaced equidistantly from each other along the length of the reactor, we have found that a stirring rate of 400 to 600 r.p.m. is satisfactory for our purposes. One skilled in the art will be advised to vary or utilize this stirring rate depending upon the particular configuration of his apparatus.

Because of the different reactivity ratios of ethylene and vinyl chloride, monomeric vinyl chloride enters an ethylene/vinyl chloride copolymer at a faster rate than does ethylene. The proportions of monomers in the feed necessary to produce a polymer of a given composition will vary depending upon the temperature and pressure of reaction, the specific catalyst system employed, the pH of the reaction system, and other variables. At a pressure of 3000 to 35,000 p.s.i., a temperature of 30 to 32° C., using a persulfate-ferrous iron-sulfoxylate catalyst-initiator system buffered to a pH of 8 to 10, the following is a tabulation of some monomer feed ratios with correspond polymer ratios.

| Percent Wt. in Monomer Feed | Will Produce | Percent Wt. Ethylene/vinyl chloride in Polymer Product |
|---|---|---|
| 60:40 | | 25:75 |
| 70:30 | | 30:70 |
| 80:20 | | 40:60 |

Other proportions of monomer feed which will produce a desired polymer product will be obvious in view of the foregoing and in view of the specific examples set forth in U.S. patent application Ser. No. 395,899, filed Sept. 11, 1964, and now abandoned.

If the binder is to be an ethylene/vinyl chloride copolymer undiluted by starch or casein, the stable ethylene/vinyl chloride latex, preferably having at least 35% solids, can be added to the clay suspension in sufficient quantity to provide a total binder solids content of from about 1 to 100% of the mineral. If the binder is an ethylene/vinyl chloride-starch or protein mixture, the starch or casein can be first added to the resin latex, and the ethylene/vinyl chloride latex-starch or casein mixture added to the clay suspension to bring the binder solids content to the desired level in the coating composition. An alternate method is to add the starch or casein in the pigment slurry and mix well prior to the addition of the ethylene/vinyl chloride latex. This method is suitable for the preparation of stable coating compositions of low (30 to 40%) solids content. A technique used to prepare coating compositions of high solids (60 to 75%) content comprises adding starch or casein to the ethylene/vinyl chloride latex and then adding the dry pigment thereto and mixing.

In addition to the water, pigment and binder, coating compositions may contain certain minor ingredients added for a number of reasons. These materials include pine oil, sulfonated tall oil, defoamants, plasticizers, wax, viscosity stabilizers, shellac, dyestuffs, fungicides, slimicides, dispersants, coalescing aids, etc. An important additive optionally incorporated into the present coating compositions are those materials which promote the curing of the ethylene-vinyl chloride polymer. Such additives include polyethylene imine, zinc oxide, ureas, urea-formaldehyde resins, melamine resins, melamine-formaldehyde resins, etc. These materials are usually used at concentrations of about 10% of the ethylene/vinyl chloride copolymer although other concentrations can be used with equal success.

The coating composition is applied to the paper stock using any of the conventional methods such as a roll coater, blade coater, air knife or size press. Upon drying, the coated paper products of this invention as produced. These coated paper products comprise a base sheet and a coating adhered to at least one surface of the base sheet, the coating comprising a mineral or inorganic pigment and a pigment binder, said pigment binder containing at least a portion of an ethylene-vinyl chloride copolymer having from about 20 to about 95% by weight polymerized vinyl chloride within the copolymer. Acceptable ethylene-vinyl chloride copolymers for use as a binder in a paper coating have previously been described in considerable detail as have the materials which can be used as pigments. The finished coating can contain from about 50 to 99% by weight of a mineral pigment and, correspondingly, from about 50 to 1% of a pigment binder. Other additives can be present in minor amounts. A preferred range of binder is from about 15 to about 25% of the total coating. A preferred range of ethylene-vinyl chloride pigment binder is from about 6 to about 25% by weight of the coating. Preferred ranges of mineral content in the coating are from about 70 to about 85% by weight.

The above description will be more clearly understood when studied in conjunction with the following specific examples which set forth some of the preferred embodiments of the present invention.

Example 1

To an evacuated one gallon autoclave was added 1520 ml. of an aqueous solution containing 15 grams of sodium bicarbonate,
9 grams of potassium peroxydisulfate,
60 grams of polyoxyethylene tridecanol containing approximately 10 moles of ethylene oxide per mole of tridecanol, and
10 ml. of a 0.15 molar solution of ferric versenate.

The vessel was heated to 28° C., at which time 550 grams of ethylene and 190 grams of vinyl chloride were added with stirring. When the temperature returned to 28° C., the pressure inside the reaction vessel was adjusted to 800 p.s.i. The polymerization was conducted at a temperature of 25° C., a pressure of 800 p.s.i., and a stirring rate of 400 r.p.m. The polymerization was started by adding 3.3 ml. of a 1.2 molar aqueous solution of ammonium hydroxide also containing 15% by weight sodium formaldehyde sulfoxylate. The polymerization was maintained by adding 1.3 ml. portions at 20 min. intervals. To maintain the reaction pressure at 800 p.s.i., additional vinyl chloride was added as required. Over a 5 hour period, a total of 27.0 ml. of the sulfoxylate/ammonium hydroxide solution and 929 grams of vinyl chloride were added to the reaction vessel. Following completion of the polymerization, stirring was discontinued and the latex allowed to separate from the unreacted monomer. The reaction vessel was then vented slowly to the atmosphere to remove unreacted monomers. A total of 2787 grams of latex having 1222 grams of copolymer solids was obtained. This represented a latex having 44% dispersed solids; polymerized vinyl chloride content of the copolymer was 77%; percent conversion was 63% by weight based on the total monomer feed; specific viscosity was 0.065; weight average particle size of the latex solid was 1750 angstroms. To the above latex was added 16 grams of polyoxyethylene nonylphenol containing approximately 10 moles of ethylene oxide per mol of nonyl phenol. The Maron stability of the resultant latex was less than 0.2 grams.

A paper coating utilizing the post-stabilized ethylene/vinyl chloride latex prepared above was formulated in the following manner. To 1034 milliliters of water was added:

575 grams of Georgia kaolinite clay,
175 grams of titanium dioxide,
70 grams of alpha-protein,
70 grams of latex,
3 grams of tributyl phosphate
9 grams of ammonium hydroxide,
1.5 grams of sodium hexametaphosphate (Calgon),
0.7 grams of diammonium hydrogen phosphate,
1.7 grams of ethylene dialdehyde, and
3.5 grams of a melamine-formaldehyde resin (Parez 613)

Thorough mixing yielded a paper coating which was tested extensively. Results are reported in Example 3.

Example 2

To an evacuated 1 gallon autoclave was added 1400 ml. of an aqueous solution containing 10 grams of sodium bicarbonate,
10 grams of potassium peroxydisulfate,
10 ml. of 15 N ammonium hydroxide,
55 grams of polyoxyethylene tridecanol containing approximately 10 moles of ethylene oxide per mole of tridecanol, and
12 ml. of a 0.15 molar solution of ferric versenate.

The vessel was heated to 30° C. at which time 700 grams of ethylene and 330 grams of vinyl chloride was added with stirring. When the temperature had returned to 30° C., the pressure inside the autoclave was 3300 p.s.i. The polymerization was started by adding 2.6 ml. of the 15% solution of sodium formaldehyde sulfoxylate and was maintained by adding 1.3 ml. portions at 15 min. intervals. After the first addition of sulfoxylate, the temperature rose to about 35° C. and was maintained at this level by regulation of jacket temperatures. As the pressure dropped due to polymerization, additional vinyl chloride was added as required to maintain the original pressure of 3300 p.s.i. A stirring rate of 400 r.p.m. was used during the entire polymerization period. Over a 4 hour period, a total of 29.3 ml. of a 15% sulfoxylate solution and 709 grams of vinyl chloride were added to the reaction vessel. After the reaction was complete, stirring was discontinued and the latex allowed to separate from the unreacted monomer. After separating, 1 ml. of a defoaming agent was added to the reaction vessel and unreacted monomer was vented slowly to the atmosphere. Upon venting to atmospheric pressure, 2609 grams of ethylene/vinyl chloride latex having 1120 grams of copolymer solids was obtained. This represented a latex having a 44% dispersed solids; polymerized vinyl chloride content of the copolymer was 70%; percent conversion was 62% by weight based upon the total monomer feed; specific viscosity was 0.084; and weight average particle size of the latex solids was 1830 angstroms. The above latex was post-stabilized by addition of 15 grams of polyoxyethylene nonylphenol containing approximately 10 moles of ethylene oxide per mole of the nonylphenol. The resultant latex had a Maron stability of less than 0.2 gram.

A paper coating comparable in all respect to the paper coating prepared in Example 1 was formulated using 14 grams of the latex of Example 2 in place of the latex prepared in Example 1.

Example 3

Three additional paper coatings comparable to the coating formulations described in Examples 1 and 2 were prepared, using instead of the ethylene/vinyl chloride latices, equal quantities of commercially available pigment binders. These coating formulations used a styrene-butadiene binder (DOW 630), a homopolymeric polyvinyl acetate binder (Gelva 925) and another homopolymeric polyvinyl acetate binder (NS 1103).

Table I below contains comparative pick resistance test data of the ethylene/vinyl chloride pigment binders and the commercially available pigment binders. Pick resistance, that is the ability of the coating to resist the pull of printing inks and remain adhered to the paper base, is measured by the IGT Printability Test, a widely accepted standard test developed by the Institut voor Graphische Techniek in Amsterdam, Holland. In the IGT test, an ink of measured tackiness is applied uniformly to a standard diameter wheel. A strip of paper or paperboard containing the test coating is fastened to a spring-loaded cylindrical segment of known diameter. The ink-laden wheel is placed against the strip at a pressure of 50 kilograms. The cylinder spring is released and the tacky ink is applied to the strip at an accelerated velocity. If the coating fails "picks," a break in the coating will be apparent at some point on the strip. This is measured and reported as the velocity in feet per minute withstood by the coating before failure. The test is run with inks of increasing tack until failure occurs. A value of 630 feet per minute represents no failure of the coating. The coating is applied by means of an air knife, the numerals under "Coating wt." being the pounds of air pressure used to blow off excess pigment and binder during the coating operation. The higher the number, the thinner is the finished coating. The inks used, Ink No. 2, 3 and 4 are standard test inks employed in the IGT test, Ink No. 4 being the tackiest. The polyisobutylene is a low molecular weight homopolymeric isobutylene dissolved in a suitable solvent to prepare a viscosity-graded solution.

TABLE I.—IGT PRINTABILITY TEST

|  | Reference Coatings | | | Ethylene/vinyl chloride Coatings | |
|---|---|---|---|---|---|
|  | 1 | 2 | 3 | Ex. 1 | Ex. 2 |
| Coating wt., a function of lbs. air pressure: | | | | | |
| Ink No. 2: | | | | | |
| 4 | 630 | 630 | 630 | 630 | 630 |
| 3 | 630 | 630 | 630 | 630 | 630 |
| Ink No. 3: | | | | | |
| 4 | 630 | 630 | 630 | 630 | 630 |
| 3 | 630 | 630 | 630 | 630 | 630 |
| Ink No. 4: | | | | | |
| 4 | 630 | 360 | 575 | 415 | 340 |
| 3 | 580 | 285 | 535 | 335 | 340 |
| Polyisobutylene: | | | | | |
| 4 | 113.8 | 68.4 | 96.5 | 110.4 | 115.6 |
| 3 | 119.6 | 62.1 | 95.9 | 96.8 | 88.1 |

Reference Coating No. 1: Dow 630 Styrene-Butadiene Pigment Binder; No. 2: Gelva 925 Polyvinyl Acetate Pigment Binder; No. 3: NS 1103 Polyvinyl Acetate Pigment Binder.

Table II reports the results of the Wax Pick test on the same type of reference coating and ethylene/vinyl chloride coatings. The Wax Pick test, like the IGT test, measures the adhesive bond between the paper and its coating. In this test, hot wax sticks of varying melting points are applied to the coated paper and let cool. The specimens are then pulled perpendicularly from the paper. The wax test sticks are graded with respect to adhesiveness from 2 to 32, the higher numbers representing increasing adhesiveness. The values reported in the table represent the highest adhesive grade of wax which did not pull the coating from the paper. The test is described fully in TAPPI test T-459.

TABLE II

|  | Reference Coatings | | | Ethylene/vinyl chloride coatings | |
|---|---|---|---|---|---|
|  | 1 | 2 | 3 | Ex. 1 | Ex. 2 |
| Coating wt., a function of lbs. air pressure: | | | | | |
| 4 | 8 | 7 | 9 | 7 | 7 |
| 3 | 9 | 7 | 9 | 8 | 7 |
| 2 | 8 | 7 | 9 | 7 | 7 |
| 1.5 | 8 | 7 | 9 | 7 | 7 |
| 1 | 8 | 7 | 9 | 7 | 7 |

Table III reports values indicating the gloss of a coating applied to paper stock. The higher the gloss, the better is the quality finish. The figures reported are the percentages of light reflected from coated paper by comparison to 100% reflectance obtained from a Carrara gloss standard. The measurement is made by measuring the reflectance of light from the paper at an angle of 75° from the plane of the paper.

TABLE IIIA.—COATING GLOSS

|  | Reference Coatings | | | Ethylene/vinyl chloride coatings | |
|---|---|---|---|---|---|
|  | 1 | 2 | 3 | Ex. 1 | Ex. 2 |
| Coating wt., a function of lbs. air pressure: | | | | | |
| 4 | 27 | 25 | 26 | 27 | 28 |
| 3 | 26 | 25 | 26 | 28 | 29 |
| 2 | 26 | 25 | 25 | 27 | 29 |
| 1.5 | 28 | 26 | 28 | 28 | 30 |
| 1 | 30 | 28 | 30 | 33 | 33 |
| Average | 27 | 26 | 27 | 29 | 30 |

The coating gloss on certain types of paper board has also been studied and measured, both before and after calendering. Results are as follows:

TABLE IIIB.—COATING GLOSS

Gloss Before Calendering

|  | Reference Coatings | | | Ethylene/vinyl chloride coatings | |
|---|---|---|---|---|---|
|  | 1 | 2 | 3 | Ex. 1 | Ex. 2 |
| Liner Board A | 16 | 13 | 21 | 14 | 13 |
| Liner Board B | 21 | 23 | 13 | 22 | 20 |
| Solid Board | 22 | 20 | 21 | 22 | 21 |
| Paper | 20 | 21 | 20 | 22 | 20 |
| Average | 20 | 17 | 17 | 20 | 17 |

Gloss After Calendering

| Liner Board A | 46 | 35 | 36 | 41 | 43 |
|---|---|---|---|---|---|
| Liner Board B | 41 | 40 | 36 | 43 | 42 |
| Solid Board | 40 | 36 | 38 | 40 | 40 |
| Paper | 51 | 52 | 52 | 62 | 58 |
| Average | 45 | 41 | 41 | 46 | 45 |

Brightness of the test paper coating is measured in the following manner: a perpendicular light source and reflectance measuring device is adjusted to read 100% reflectance from a calcium carbonate block. Values reported in Table IVA represent the percent reflectance obtained from a coated liner board.

TABLE IVA.—BRIGHTNESS

|  | Reference Coatings | | | Ethylene/vinyl chloride coatings | |
|---|---|---|---|---|---|
|  | 1 | 2 | 3 | Ex. 1 | Ex. 2 |
| Coating wt., function of lbs. air pressure: | | | | | |
| 4 | 74 | 76 | 73 | 74 | 74 |
| 3 | 75 | 77 | 74 | 75 | 75 |
| 2 | 77 | 79 | 76 | 77 | 76 |
| 1.5 | 78 | 80 | 78 | 79 | 78 |
| 1 | 80 | 81 | 80 | 80 | 80 |
| Average | 77 | 78 | 76 | 77 | 77 |

Table IVB reports the extent of brightness degradation on coated test papers. The test papers are placed in an oven at 105° C. Brightness measurements are made at specified intervals. Coatings were applied using an air knife with 1 lb. air pressure.

TABLE IVB.—BRIGHTNESS DEGRADATION

|  | Reference Coatings | | | Ethylene/vinyl chloride coatings | |
|---|---|---|---|---|---|
|  | 1 | 2 | 3 | Ex. 1 | Ex. 2 |
| Time at 105° C.: | | | | | |
| Initial | 80 | 81 | 80 | 80 | 80 |
| 1 hr | 77 | 80 | 79 | 80 | 80 |
| 2 hr | 78 | 81 | 78 | 79 | 79 |
| 2 days | 74 | 80 | 77 | 78 | 78 |
| 8 days | 71 | 79 | 76 | 77 | 77 |
| Average | 76 | 80 | 78 | 79 | 79 |

Table VA reports results of the Gloss Ink Holdout test which measures the ability of a paper coating to hold a glossy ink or varnish on its surface for a period of time before absorption therein. In carrying out the test, a standard ink is applied to coated liner board by a proof press or hand brayer. The reflectance of the ink after drying is measured at a 75° angle of incidence.

TABLE VA.—GLOSS INK HOLDOUT

|  | Reference Coatings | | | Ethylene/vinyl chloride coatings | |
|---|---|---|---|---|---|
|  | 1 | 2 | 3 | Ex. 1 | Ex. 2 |
| Coating Wt., lbs. air pressure: | | | | | |
| 4 | 66 | 50 | 67 | 70 | 66 |
| 3 | 68 | 59 | 69 | 68 | 70 |
| 2 | 73 | 68 | 76 | 73 | 73 |
| 1.5 | 77 | 66 | 75 | 72 | 76 |
| 1 | 77 | 70 | 81 | 78 | 75 |
| Average | 72 | 63 | 73 | 72 | 72 |

Using a gloss varnish (OP 74) in place of the ink, the following results were obtained.

TABLE VB

|  | Reference Coatings | | | Ethylene/vinyl chloride coatings | |
|---|---|---|---|---|---|
|  | 1 | 2 | 3 | Ex. 1 | Ex. 2 |
| Coating wt., lbs. air pressure: | | | | | |
| 4 | 40 | 23 | 46 | 48 | 45 |
| 3 | 47 | 25 | 47 | 57 | 47 |
| 2 | 41 | 37 | 47 | 55 | 51 |
| 1.5 | 46 | 38 | 52 | 58 | 52 |
| 1 | 54 | 42 | 53 | 58 | 51 |
| Average | 46 | 33 | 49 | 55 | 49 |

Wet Rub Resistance of the test paper coatings is reported in Tables VI. The test procedure is as follows: five drops of distilled water are placed on the edge of a coated liner board. A finger is wiped through the water onto a black paper sheet eight times, shifting the black paper after each wipe. The first number of the test results indicates the number of wipes necessary to deposit some of the pigment onto the black paper. The second number indicates the quantity of pigment removed on the indicated rub with "1" indicating a large deposit and "5" indicating just a trace.

TABLE VIA.—WET RUB RESISTANCE

|  | Reference Coatings | | | Ethylene/vinyl chloride coatings | |
|---|---|---|---|---|---|
|  | 1 | 2 | 3 | Ex. 1 | Ex. 2 |
| Coating wt., lbs. air pressure: | | | | | |
| 4 | 1-5 | >8-5 | >8-5 | >8-5 | >8-5 |
| 3 | 1-5 | >8-5 | >8-5 | >8-5 | >8-5 |
| 2 | >8-5 | >8-5 | >8-5 | >8-5 | >8-5 |
| 1.5 | >8-5 | >8-5 | >8-5 | >8-5 | >8-5 |
| 1 | >8-5 | >8-5 | >8-5 | >8-5 | >8-5 |

In Table VIB, the coatings were applied to different paper stocks using an air knife pressure of one lb. per square inch.

TABLE VIB

|  | Reference Coatings | | | Ethylene/vinyl chloride coatings | |
|---|---|---|---|---|---|
|  | 1 | 2 | 3 | Ex. 1 | Ex. 2 |
| Coating wt., lbs. air pressure: | | | | | |
| Liner Board A | 1-4 | 1-5 | 1-5 | 1-5 | 1-5 |
| Liner Board B | >8-5 | 1-5 | 1-5 | 1-5 | 1-5 |
| Solid Board | 1-5 | 1-5 | 1-5 | 1-5 | 1-5 |
| Paper | 1-5 | 1-5 | 1-5 | 1-5 | 1-5 |

Example 4

An ethylene/vinyl chloride copolymer latex was prepared according to the procedure described in Example 1 except that the polymerization was carried out at 35° C. and 19,300 p.s.i. using a sodium tridecylbenzenesulfonate emulsifier and a sodium carbonate buffer. The monomer charge was altered to provide a latex having 40% ethylene-vinyl chloride copolymer solids with a polymerized vinyl chloride content of 31%; specific viscosity was 0.110; particle size was 1400 angstroms; Maron stability was less than 1 gram. A paper coating composition was prepared as described in Example 1 using the latex described above as the binder. The coating composition contained 28% kalonite and 40% total solids. Paper coated with this composition had fair pick resistance, good brightness characteristics, and very good gloss ink holdout.

Example 5

An ethylene/vinyl chloride copolymer latex was prepared according to the procedure described in Example 1 except that the polymerization was carried out at 35° C. and 3500 p.s.i. using a sodium lauryl sulfate emulsifier and a sodium pyrophosphate buffer. The monomer charge was altered to provide a latex having 33% ethylene-vinyl chloride copolymer solids with a polymerized vinyl chloride content of 40%; particle size was 1500 angstroms; Maron stability was less than 1 gram. A paper coating composition was prepared as described in Example 1 using the latex described above as the binder. The coating composition contained 28% kaolinite and 40% total solids. Paper coated with this composition had good pick resistance, good brightness characteristics and very good gloss ink holdout.

Example 6

An ethylene/vinyl chloride copolymer latex was prepared according to the procedure described in Example 1 except that the polymerization was carried out at 30° C. and 3300 p.s.i. using a sodium dodecylbenzene sulfonate and a combination sodium pyrophosphate ammonium hydroxide buffer. The monomer charge was altered to provide a latex having 48% ethylene-vinyl chloride copolymer solids with a polymerized vinyl chloride content of 50%; particle size of the latex solids is 1140 angstroms; specific gravity is 0.09; Maron stability was less than 1 gram. A paper coating composition was prepared according to the procedure described in Example 1 using the latex prepared above as the binder. The coating composition contained 28% kaolinite and 40% total solids. Paper coated with this composition had good pick resistance, good brightness characteristics and very good gloss ink holdout.

Example 7

An ethylene-vinyl chloride copolymer latex was prepared exactly as described in Example 1 except that the monomer charge was altered to provide a copolymer having 91% polymerized vinyl chloride. The latex contained 49% copolymer solids and had a Maron stability of less than 1 gram upon removal from the reactor. A paper coating composition was immediately formulated as described in Example 1 using the above latex as the binder. The coating composition contained 38% kaolinite and 12% copolymer solids. Paper coated with this composition had excellent web rub characteristics, good brightness, and good gloss ink holdout.

Examination of the test data indicates that paper coating formulations using an ethylene/vinyl chloride binder, although slightly inferior to a styrene-butadiene binder with respect to pick resistance, do nevertheless perform satisfactorily and are pigment binders which can be used successfully on a commercial scale. The principal advantages gained by using an ethylene/vinyl chloride binder are excellent coating gloss, gloss ink holdout, brightness, resistance to brightness degradation, and freedom from objectionable odor and wet rub resistance comparable to other commercially available pigment binders.

What is claimed is:

1. A coated paper product comprising a base sheet and a coating adhered to at least one surface of said base sheet, said coating comprising a mineral and a pigment binder, said pigment binder containing at least a portion of an ethylene/vinyl chloride copolymer having from about 20 to about 95% by weight polymerized vinyl chloride.

2. A coated paper product according to claim 1 wherein said coating contains from about 6 to about 25% by weight of said ethylene/vinyl chloride copolymer.

3. A coated paper product according to claim 1 wherein said ethylene/vinyl chloride copolymer contains from about 50 to about 82% by weight polymerized vinyl chloride.

4. A coated paper product comprising a base sheet and a coating adhered to at least one surface of said base sheet, said coating comprising a mineral and from 15 to 25% by weight based upon the total coating of a pigment binder, said pigment binder consisting of approximately 50% of a substance selected from the group consisting of pigment binding starches, and proteinaceous materials and approximately 50% of an ethylene/vinyl chloride copolymer containing from about 50 to about 82% by weight polymerized vinyl chloride.

5. A paper coating composition comprising water, a finely divided paper coating mineral, and a polymeric binder, said binder containing at least a portion of an ethylene/vinyl chloride copolymer having from about 20 to about 95% by weight polymerized vinyl chloride, said clay and said binder being intimately dispersed in said water to form an aqueous dispersion.

6. A paper coating composition according to claim 5 wherein said composition contains from about 18 to about 33% based on the weight of the mineral of a polymeric binder, said binder containing at least a portion of an ethylene/vinyl chloride copolymer having from about 20 to about 95% by weight polymerized vinyl chloride.

7. A paper coating composition according to claim 5 wherein said composition contains from about 6 to about 33% ethylene/vinyl chloride copolymer solids.

8. A paper coating composition according to claim 5 wherein said ethylene/vinyl chloride copolymer contains from about 50 to about 82% by weight polymerized vinyl chloride.

9. A paper coating composition according to claim 5 wherein said mineral comprises from about 25 to about 75% by weight of the total composition.

10. A paper coating composition comprising water, from about 25 to about 75% by weight of a finely divided paper coating mineral, and from 18 to about 33% based on the weight of the mineral of a polymeric binder, said binder consisting of approximately 50% of a substance selected from the group consisting of pigment binding starches, and proteinaceous materials and approximately 50% of an ethylene/vinyl chloride copolymer containing from about 50 to about 82% by weight polymerized vinyl chloride.

11. A process for preparing a mineral-coated paper product comprising applying to a paper product an aqueous dispersion comprising water, a finely divided paper coating mineral, and a polymeric binder, said binder containing at least a portion of an ethylene/vinyl chloride copolymer having from about 20 to about 95% by weight polymerized vinyl chloride, and thereby forming the coating on the paper.

12. A process according to claim 11 wherein said dispersion contains from about 18 to about 33% based on the weight of the mineral of a polymeric binder containing at least a portion of an ethylene/vinyl chloride copolymer having from about 20 to about 95% by weight polymerized vinyl chloride.

13. A process according to claim 11 wherein said dispersion contains from about 6 to about 33% ethylene/vinyl chloride copolymer solids added to said dispersion in the form of a stable latex.

14. A process according to claim 11 wherein said ethylene/vinyl chloride copolymer contains from about 50 to about 82% by weight polymerized vinyl chloride.

15. A process according to claim 11 wherein said mineral comprises from about 25 to about 75% by weight of the total composition.

16. A process for preparing a mineral-coated paper product comprising applying to a paper product an aqueous dispersion comprising water, from about 25 to about 75% by weight of a finely divided paper coating mineral, and from 18 to about 33% based on the weight of the mineral of a polymeric binder, said binder consisting of approximately 50% of a substance selected from the group consisting of pigment binding starches, and proteinaceous materials and approximately 50% of an ethylene/vinyl chloride copolymer containing from about 50 to about 82% by weight polymerized vinyl chloride, and thereby forming the coating on the paper.

References Cited

UNITED STATES PATENTS

| | | | |
|---|---|---|---|
| 3,111,505 | 11/1963 | Rust et al. | 260—87.5 |
| 3,267,060 | 8/1966 | Putnam et al. | 260—8 |
| 3,297,618 | 1/1967 | Glabisch et al. | 260—87.5 |

WILLIAM H. SHORT, *Primary Examiner.*

E. M. WOODBERRY, *Assistant Examiner.*